United States Patent [19]
Bundy

[11] 3,939,780
[45] Feb. 24, 1976

[54] APPARATUS FOR SHIPPING FLAT GLASS WITHOUT PACKING CASES

[75] Inventor: Albert J. Bundy, Kingsport, Tenn.

[73] Assignee: ASG Industries, Inc., Kingsport, Tenn.

[22] Filed: Oct. 9, 1974

[21] Appl. No.: 513,303

[52] U.S. Cl. ............... 105/367; 105/492; 206/451; 214/10.5 R
[51] Int. Cl.² ..................... B61D 3/16; B65D 81/02
[58] Field of Search .......... 206/449, 451, 452, 454; 105/367, 463, 489, 490, 491, 492, 493, 494, 495, 496; 214/10.5, 152

[56] References Cited
UNITED STATES PATENTS

| 3,596,755 | 8/1971 | Bundy | 105/492 X |
| 3,809,234 | 5/1974 | Kurick | 105/367 X |

*Primary Examiner*—M. Henson Wood, Jr.
*Assistant Examiner*—Gene A. Church
*Attorney, Agent, or Firm*—Pennie & Edmonds

[57] ABSTRACT

A stack of flat glass sheets standing on edge in a vertical position are supported laterally by padded adjustable jack screws extending inwardly from the vertical lateral walls of a container such as a railcar, truck, trailer, or the like.

5 Claims, 5 Drawing Figures

"3,939,780"

APPARATUS FOR SHIPPING FLAT GLASS WITHOUT PACKING CASES

THE PRIOR ART

In previous mechanisms for laterally supporting stacks of flat glass sheets for transport, numerous devices have been employed including an A-frame as disclosed in U.S. Pat. No. 3,596,755. In said patent, a pair of A-frames on each side of a glass stack are provided against which the glass stacks rest in a slightly tilted position. A central spacing frame generally of an inverted A-frame shape is provided to press the two separate glass stacks outwardly against the aforementioned A-frames. One reason for using the prior art type of A-frame is to provide a tilt to all or most of the stacks of glass of 3°–4° from the vertical to help to insure that the stack of glass or one or more sheets thereof do not fall over during loading or unloading as they well might if loaded vertically. Should one or more sheets or a whole stack fall over, not only would the glass be destroyed but the workmen working in the truck during the loading or unloading operation could be severely injured. The slight 3°–4° tilt of the A-frames helps to prevent such an accident. Additionally, the A-frames support the glass substantially independently of the sides of the truck body since the A-frames transfer the pressures exerted by the glass stacks to the floor of the truck or other container. For this reason it is possible to use open top truck and trailer bodies such as the so-called "rag top" trailer.

While this type of prior art device does apply an even pressure over the faces of the stack of glass sheets thus combining the sheets into a laminated columnar structure, the A-frames occupy considerable space in the container, railcar, truck body, trailer or the like. This, of course, reduces the quantity of glass sheets that may be shipped. Additionally, the A-frames are large in size and occupy considerable space when the container is returned with the A-frames therein. Furhter, conversion of the container such as the truck body for use in hauling other materials on the return trip is severely limited by the presence of the large A-frames.

BRIEF DESCRIPTION OF THE INVENTION

The presently disclosed device is mounted on the lateral walls of the container and carries a plurality of padded jack screws which bear against opposite sides of stacks of glass sheets to hold the sheets firmly together in a monolithic structure that acts substantially as a single laminated columnar structure. When loading or unloading the container using the device of the present invention, the container itself is tilted 3°–4° to provide against the possibility of a stack of glass or sheets thereof falling over. The stacks are loaded parallel to the sides of the container while it is so tipped and as such when later, the container is again returned to its normal position, the stacks of glass will be held in a vertical position, all as more fully described below.

When the container is not in use for stacks of glass sheets, the jack screws may be moved forwardly of the container substantially out of the way of any different cargo that it may be desired to carry.

DESCRIPTION OF THE PREFERRED EMBODIMENT

Figure 1:
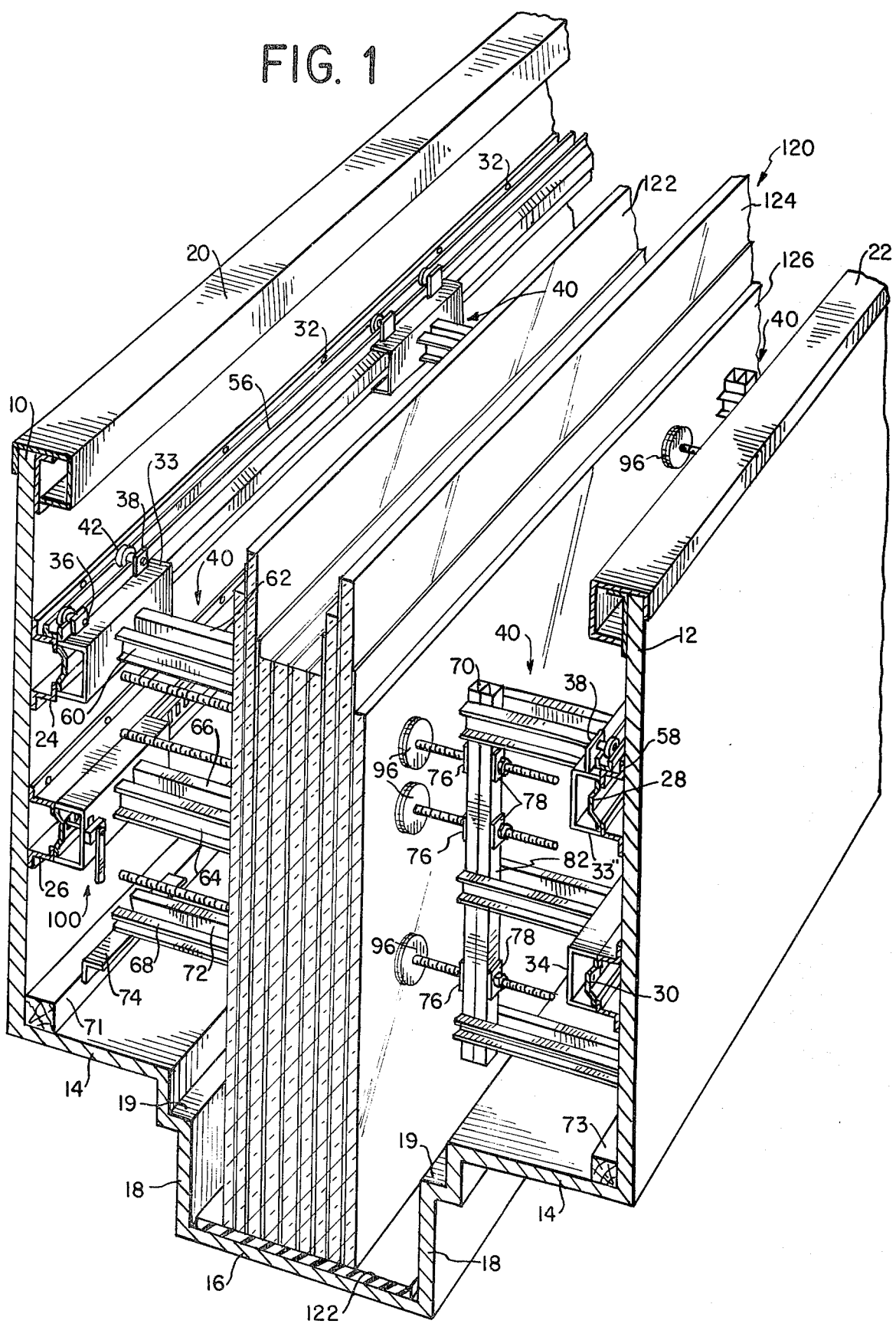
FIG. 1 shows a portion trailer body of the dropped floor type having the device of the present invention installed therein.

Referring now to FIG. 1 there is shown a trailer body of the dropped floor type having vertical lateral walls 10 and 12, and upper floor level 14, and a lower floor level 16 dropped downwardly from said first level 14. Vertical walls 18 connect the two floor levels 14 and 16. For convenience of loading from a crane, an open top or so-called "rag top" trailer is preferred. Accordingly, each of the vertical walls 10 and 12 of the trailer are strengthened by three longitudinal channel members, one at the top and two additional channel members intermediate the top and bottom of each wall. Along the top of the wall 10 is a strengthening channel member 20 and a similar strengthening member 22 extends along the upper edge of the wall 12. Secured to the wall 10 and running along the length thereof horizontally is an upper track 24 and a lower track 26. A track 28 like the member 24 extends along the length of the wall 12 above a lower track 30 extending along the wall 12. The tracks 24–30 are secured to their respective walls 10 and 12 in any conventional manner including bolting, welding and the like with bolts 32 being shown for illustrative purposes only. These tracks not only serve to guide a movable frame as hereinafter described, but also strengthen the side walls 10 and 12 to which they are fixed.

Supported by the tracks 24 and 26 are two movable frames 40 identical in construction to each other and to two cooperating frames 40 supported by the tracks 28 and 30 on wall 12. Since all four movable frames 40 shown in FIG. 1 are identical only one thereof will be described in detail herein.

Figure 2:
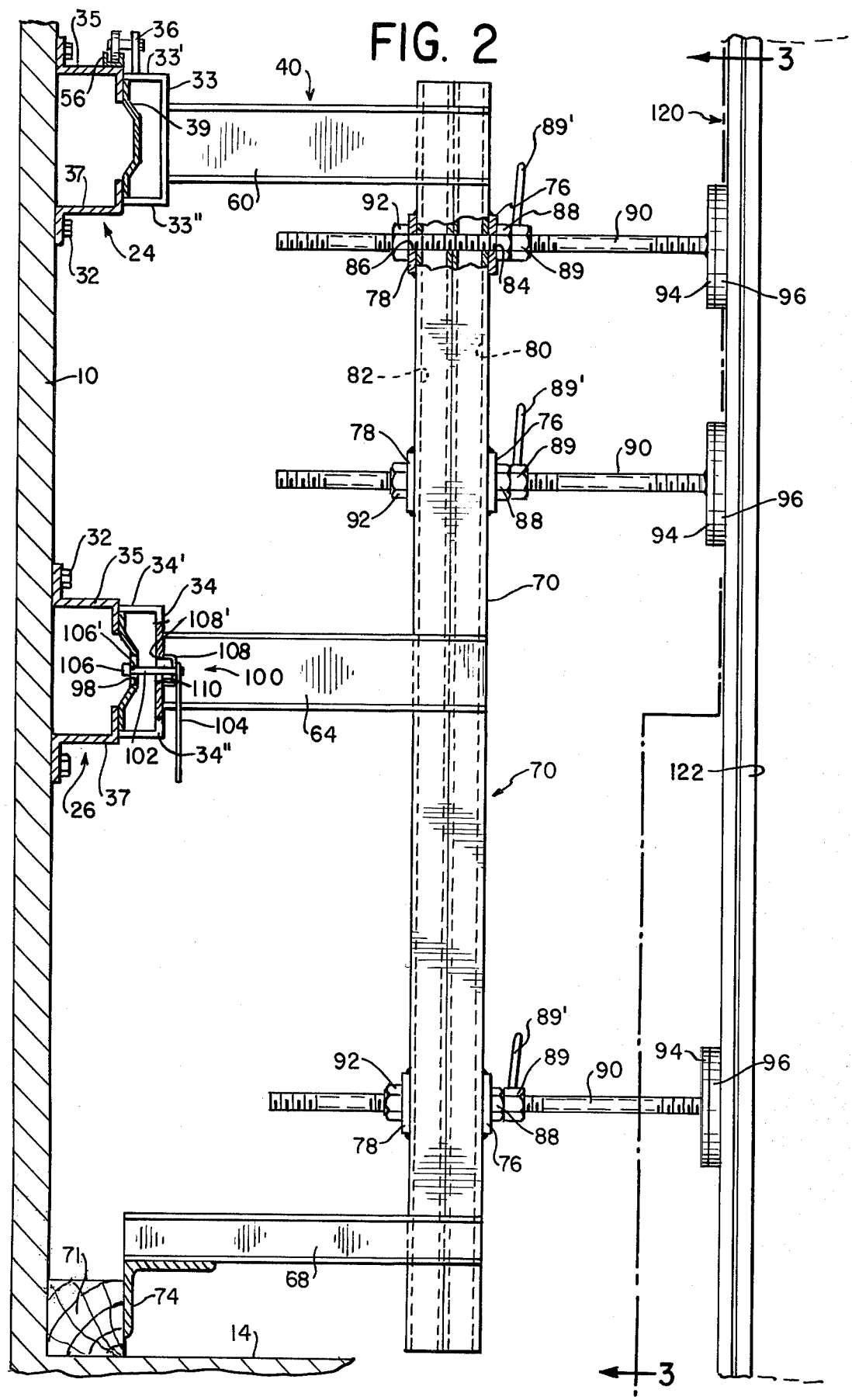
FIG. 2 shows one of the frame members as viewed from the rear of the container.

The frames 40 each comprise a U-shaped channel member 33 engaging the track 24, and another U-shaped channel member 34 engaging the track 26. Each of the tracks 24 and 26 (as well as tracks 28 and 30 on the opposite side) have top and bottom Z-shaped members 35 and 37, respectively, connected by a facing member 39 shaped in cross-section as shown in FIG. 2. The legs 33', 33" and 34', 34" of the channel members 33 and 34 respectively bear against the Z-shaped members of the channels 24 and 26 and loosely engage the upper and lower edges of the longitudinal facing members 39 for reasons hereinafter set forth.

Secured at either end of the channel member 33 are upstanding ears 36 and 38 (see FIG. 3) fixed thereto as by welding. As shown in FIG. 4 (with respect to the ear 38, only) a roller 42 is mounted by bolt 44 passing through the center opening of the roller 42 and through an opening 48 in the ear 38. A nut 46 secures the bolt 44 in place. A spacer member 50 spaces the roller 42 away from the adjacent face of the ear 36. It will be appreciated that ear 36 has an identical roller mounted in the same fashion thereon as shown on the lefthand side of FIG. 3, where the ear 36 has a roller 52 supported therefrom by a bolt 54.

The rollers 42 and 52 engage loosely in track 56 secured on the top of the upper rail 24 or in the track 58 on the upper rail 28 depending upon which side of the trailer the frame 40 is being mounted upon. Accordingly, the rollers 42 and 52 support substantially all of the weight of the entire frame member 40.

Extending outwardly from the channel member 33 are two parallel U-shaped channel members 60 and 62 secured, as by welding, to the member 33. Extending outwardly from the channel member 34 are two parallel U-shaped channel members 64 and 66 secured to said channel member 34 at one end. Extending vertically of the frame 40 is generally rectangular tubular member 70 which passes between the channel member 60, 62 and also between the channel members 64 and 66 and is secured to said channel members 60, 62, 64 and 66 by any suitable means such as welding.

Adjacent its lower end the vertical frame member 70 has secured thereto a pair of U-shaped channel members 68, 72 by welding or the like, which members 68, 72 extend toward the wall of the trailer. A brace 74 extends transversely of the channel members 68 and 72 being secured thereto to maintain their rigidity and alignment. The brace 74 bears against a wooden block 71 secured in the lower corner of the trailer as shown.

Each of the vertical frame members 70 has three pairs of reinforcing plates 76 and 78 secured to the opposite walls 80 and 82 respectively of the tubular frame member 70. Openings 84 extend through the reinforcing plates 76 and their adjacent wall 80, and openings 86 extend through reinforcing plates 78 and their adjacent wall 82. Openings 84 and 86 are in alignment. Each of the plates 76 has welded thereto a nut 88 with its opening in alignment with the openings 84 and each of the plates 78 has welded thereto a nut 92 with its opening in alignment with the opening 86. Passing through the openings 84 and 86 and threadedly engaged in the nuts 88 and 92 are jack screws 90. Accordingly, the jack screws 90 pass entirely through the tubular frame member 70. The jack screws 90 may by rotation thereof be adjusted inwardly and outwardly with respect to the frame member 70 and the side walls 10 and 12 of the trailer. At their outer ends, the jack screws 90 have secured thereto pressure plates 94 having cushioned surfaces 96 of rubber or the like. A lock nut 89 is also threaded on the jack screw 90 to hold the jack screw in its adjusted position by being drawn tightly against the nut 88. A handle 89' may be provided on the nut 89 in order to avoid the use of wrenches in and about the glass sheets.

The lower rails 26 and 30 have a plurality of rectangular openings 98 along their length.

The channel member 34 has a similar rectangular opening 110. When the frame 40 has been slid along the track 56 to its desired location the opening 110 in the channel member 34 is aligned with one of the openings 98. A locking device 100 comprises a pin 102 having fixed thereto at one end a handle 104 and a lock member 106 secured to the other end thereof. A spacer member 108 is fixed to the pin 102 adjacent to the handle 104.

To lock the frame 40 in place the lock member 106 is inserted through the opening 106 and the selected aligned opening 98 in the rail 26. At this time the handle 104 will be in the dotted line position shown in FIG. 3. The handle 104 is then turned downwardly 90° to the solid line position of FIG. 3 in which position the length of the locking member 106 will be at right angles to the long dimension of the opening 98 in the rail 26 thus locking the channel 34 to the rail 26. The distance between the facing surfaces 106' and 108' of the locking member 106 and the spacer 108 respectively is such as to exert a slight clamping pressure to the channel 34 and the facing member 39 of the rail 26 to hold the two firmly together. In this way the legs 34' and 34'' of the channel 34 are held in the position shown in FIG. 2 in engagement with the upper and lower edges of the member 39. This prevents any vertical movement, particularly upward vertical movement of the frame 40. Were the frame 40 not so locked, it might move upwardly enough to disengage its supporting rollers 42 and 52 from the track 56 thus coming loose from the trailer body entirely. Of course, once the glass is stacked in place and the jack screws 90 have been fully extended to bear against a glass stack, the pressure and counter pressure between the glass stack and the frame 40 serves to maintain the channel legs 34', 34'' of the channel 34 and legs 33', 33'' of the channel 33 in engagement with the upper and lower edges of the rail facing members 39 irrespective of whether the locking mechanism 100 is in place or not, though the locking mechanism 100 would still maintain the frame 40 in the selected position longitudinally of the trailer.

Figure 3:
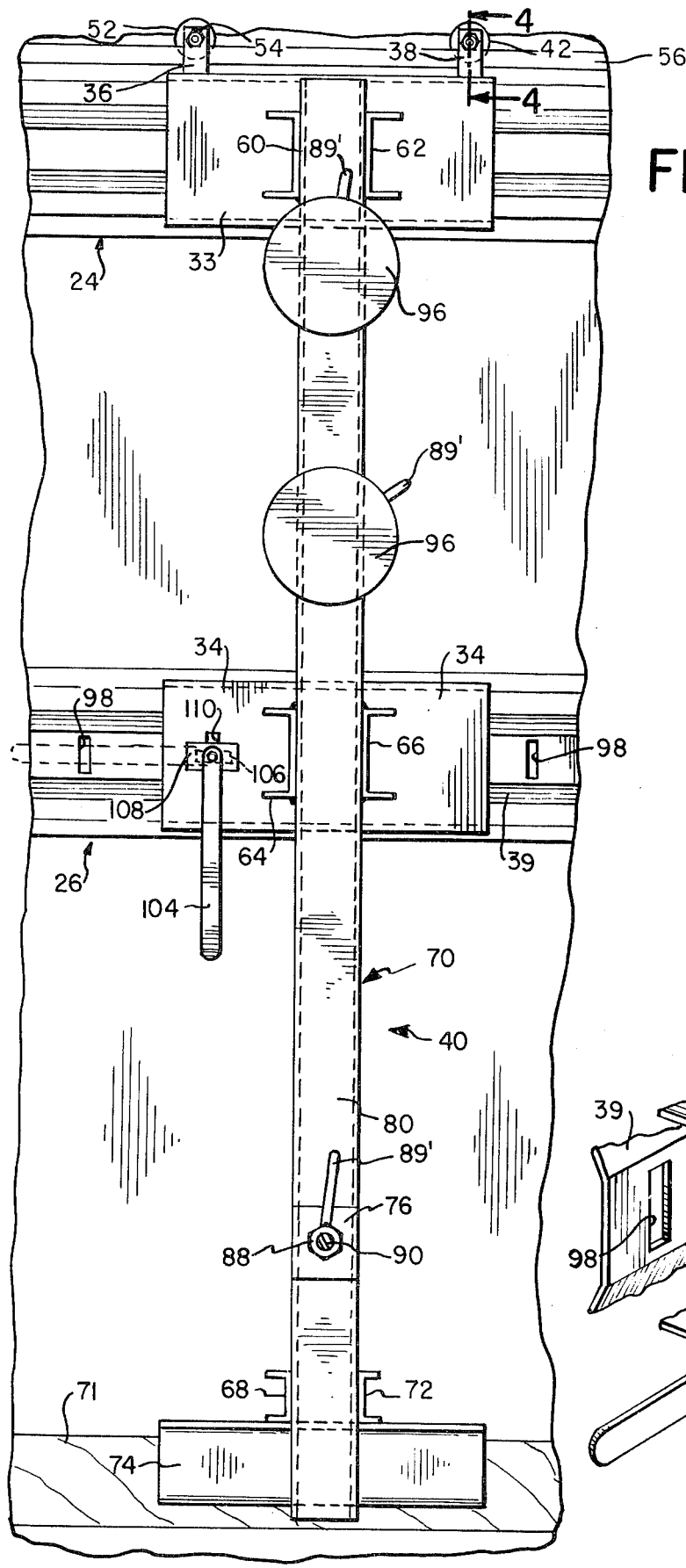
FIG. 3 shows the frames member of FIG. 2 taken along the line 3—3 of FIG. 2.
Figure 4:
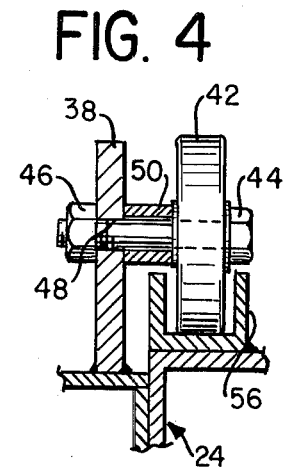
FIG. 4 is an enlarged showing of the supporting roller structure taken along the line 4—4 of FIG. 3.
Figure 5:
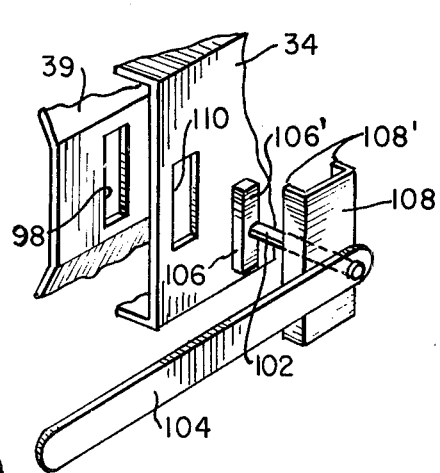
FIG. 5 is an enlarged showing of the locking mechanism.

When adjusting the location of the frame 40 along the rail 20, the locking mechanism is turned 90° to its dotted line position as shown in FIG. 3 and the locking member 106 pulled free of the rail 26. It is not necessary to pull the locking mechanism 100 entirely free of the frame 40 as well, for the locking member 106 may be left engaged with the channel 34 by turning the handle 104 to its solid line position as shown in FIG. 3. In this position the locking member is free of the rail 26 but is turned at right angles to the opening 110 in the channel 34 and thus remains attached to the frame 40 for movement therewith along the length of the trailer or for removal therefrom.

When removing the frame 40 from the trailer or other container the locking mechanism may be completely removed or may be merely disconnected from the rail 26 while remaining engaged with the channel 34 as above described. The frame 40 is then removed by pulling the lower end outwardly away from the adjacent wall (to the right in FIG. 2) until the leg 34'' is free of the lower edge of the rail facing member 39. Once the leg 34'' is lifted or pulled free from the lower edge of the rail facing member 39 and the lower leg 33'' of the rail 33 is free of the lower edge of the rail facing member 39 for the upper rail 24, the entire frame 40 may be lifted to disengage the roller supports 42 and 52 from the track 56 thus totally freeing the frame 40 from the wall of the container such as a trailer. When assembling the device the reverse procedure is taken, first engaging the rollers 42 and 52 in the track 56, then permitting the frame 40 to fall into position shown in FIG. 2 with the lower legs 33'' and 34'' of the channels 33 and 34 respectively engaged beneath the lower edges of their corresponding rail facing member 39 and with the angular brace 74 bearing against the wooden block 71. The locking device 100 may then be installed as above described.

On return shipments of the container such as "rag top" trailer, the four or more frames 40 may either be stored at the extreme forward end of the trailer or other container or they may be placed in the well of the dropped floor defined by the floor 16 and the walls 18 and the well covered in known manner by flat boards or other like elements resting upon the ledge 19.

As shown in FIG. 1, a single "drop" or shipment of glass 120 is positioned vertically in the center of the trailer with paper or other like cushioning member interleaved between adjacent sheets of glass in known manner. Four movable frame members 40 are required for each such shipment or "drop" of glass with two of such frame members on each side of the stack. If two "drops" or shipments of glass are to be made in the one trailer, that may be arranged advantageously with one "drop" toward the front and one "drop" toward the rear in which case eight such frames 40 will be required with four used for each "drop".

As shown in FIG. 1, the stack of glass sheets 120 rests upon a cushioned floor 122 of rubber, fiberboard or the like in a vertical position. The jack screws 90 are adjusted such that the padded surfaces 90 thereof bear against the opposite sides of said stack of glass sheets 120. Suitable pressure is applied in this way to cause the stack 120, despite the fact that it is made up of a number of glass sheets to behave as a single unitary or monolithic structure with each sheet giving strength to the total stack. It will be seen that as shown the stack may comprise separate segments 122, 124, 125 which may each incorporate sheets of different heights and which stacks may be of different heights as well. The length of the stack 120, of course, and particularly of the shortest sheets in the stack 120 will govern the location along the wall of the movable frames 40.

During the loading of a plurality of stacks of glass in the trailer it will be appreciated that it is necessary for workmen to move about in the trailer to adjust the jack screws 90. Normally, a plurality of stacks of glass sheets, as mentioned above is made up of separate segments or stacks as 122, 124 and 126 which are loaded separately. Not only may the separate stacks be of differing heights, but there will be separate stacks for each "drop" or shipment destination. In order that the first stack or stacks loaded do not tip over upon the workmen working in the container or trailer and to insure that not even a single sheet of a stack falls over, the truck or trailer wheels on one side thereof are driven onto a suitable ramp to tilt the container or trailer body thereof 3°–4° with respect to the vertical having reference to the normally vertical lateral walls thereof. The separate stacks or "drops" are then loaded one at a time with the first bearing against the pads 96 on the jack screws 90 on the lower side of the trailer, which pads have been previously positioned. After loading of the several stacks or "drops", pads 96 on the jack screws 90 on the frames 40 supported from the upper wall of the trailer are then adjusted to hold the stacks parallel to the walls 10 and 12 of the trailer. The trailer is then driven off the ramp whereon the walls 10 and 12 and the several stacks are all parallel. At this point the pressure of the pads 96 on the opposite sides of the stacks 122 and 124 and 126 combines all of said stacks into one monolithic unitary structure comprised of all of the sheets thereof with a thin paper layer between each sheet.

While the above description has been made with specific reference to the trailer of the drop floor type, it will be appreciated that the same can readily be used in a container, railcar, trailer or truck with a floor of a single level such as the level 14. Similarly, the above description has been specific to a "rag top" or open roofed trailer or other like container because of the ease of loading or unloading the same; however, it will be appreciated that the invention is useful in closed top trailers, trucks, railcars and other like containers even though the loading of the same may be somewhat more difficult than with an open top.

I claim:

1. An apparatus for shipping stacks of sheet glass comprising a container having a pair of parallel vertical walls and a substantially horizontal floor therebetween, a track secured to each of said walls extending horizontally lengthwise thereof, a pair of movable frames supported from each of said tracks, said frames being slidable with respect to their respective tracks for positioning at any one of a plurality of selected points therealong, at least one jack screw supported by and extending outwardly of each of said movable frames, each of said jack screws terminating in a glass engaging surface, the jack screws of that pair of movable frames supported by one of said walls having their glass engaging surfaces facing toward the glass engaging surfaces of those jack screws of the pair of movable frames supported by the other of said walls, threaded means on each of said movable frames in which said jack screws are threadedly engaged whereby said jack screws may be adjusted to hold a stack of glass sheets resting on edge on said floor firmly gripped between said opposed engaging surfaces.

2. The apparatus of claim 1 in which there are a plurality of jack screws on each of said movable frames.

3. The apparatus of claim 2 in which said movable frames are supported from their respective tracks by means of rollers on said frames engaged in cooperating surfaces on said tracks.

4. The apparatus of claim 3 in which there is a guiding track secured to each of said walls below and parallel to said first mentioned tracks, and means on each of said movable frames slidably engaging their respective guiding tracks.

5. The apparatus of claim 4 in which said guiding tracks have a multiplicity of openings there along and each of said movable frames has an opening engaging member for selective engagement in one or said openings.

* * * * *